United States Patent [19]

Orlando et al.

[11] 3,936,881

[45] Feb. 3, 1976

[54] AIR DAMPED HEAD SUSPENSION

[75] Inventors: Anthony W. Orlando, Highland; James A. Weidenhammer, Poughkeepsie, both of N.Y.

[73] Assignee: International Business Machines Corporation, Armonk, N.Y.

[22] Filed: July 1, 1974

[21] Appl. No.: 484,828

[52] U.S. Cl. .............................. 360/103; 360/104
[51] Int. Cl.² G11B 5/60; G11B 17/32; G11B 21/20
[58] Field of Search ........ 360/103, 98, 99, 104, 102

[56] References Cited
UNITED STATES PATENTS

| | | | |
|---|---|---|---|
| 3,249,701 | 5/1966 | Silver | 360/103 |
| 3,268,877 | 8/1966 | Hagen | 360/103 |
| 3,769,467 | 10/1973 | Gabor | 360/103 |
| 3,786,457 | 1/1974 | Kahn | 360/103 |
| 3,829,622 | 8/1974 | Elliot | 360/103 |
| 3,838,462 | 9/1974 | Barbeau et al. | 360/99 |

*Primary Examiner*—Robert S. Tupper
*Attorney, Agent, or Firm*—Robert Lieber

[57] ABSTRACT

In a flexible disk magnetic storage device, a suspension assembly for holding a transducing head in proper transducing relationship to a target disk regardless of the radial position of the track. The assembly incorporates a chamber which is filled with gaseous fluid and expanded in order to move a chamber enclosing member with a transducing head mounted thereon. The head is moved axially into transducing relationship with the disk surface and continues to move until the disk surface exerts counter-balancing axial forces on the head to prevent further movement. An escape path is provided so that a small amount of fluid continually escapes from the chamber equal to the rate at which fluid is introduced into the chamber when all axial forces are in balance. Such an assembly damps the rapidity of any change in axial position of the head induced by variations of the flexible disk surface away from a constant plane during rotation.

The assembly also provides a constant mating force of head to disk over a working range of axial head movement by providing an escape path of constant length, i.e., constant flow resistance.

7 Claims, 4 Drawing Figures

AIR DAMPED HEAD SUSPENSION

CROSS REFERENCE TO RELATED PATENT APPLICATIONS

This patent application relates to an improvement in flexible disk storage devices such as are disclosed in detail in U.S. patent applications Ser. Nos. 375,985; 375,986; 375,987; 375,988 and 375,989. All of these patent applications have been indicated allowable. Specifically, the disclosure of Ser. No. 375,986 is incorporated herein by reference.

This invention relates to data storage devices and more particularly to transducing read/write head suspension means in a flexible disk magnetic storage device.

BACKGROUND OF THE INVENTION

Stacks of flexible magnetic recording disks mounted on a rotating spindle provide large amounts of easily accessible, randomly accessible storage at low cost. In these storage devices, exemplified by the aforenamed patent applications, some type of partitioning means is used to select a particular disk and spread apart the disk stack for purposes of providing space for the insertion of a read/write transducing head. The transducing head is then inserted into the space to have access to the recording surface on the target disk.

In the aforenamed incorporated patent application, it is shown that the relationship between the transducing head and the target disk can be fine tuned to provide an air lubricated compliant form for close juxtaposition of the transducing head to the recording surface. The relationship of the head to the recording surface is controlled by the head contour and by head position relative to the target disk. The incorporated reference describes means for tuning the position of the transducing head by providing adjustable positioning mechanisms for the transducing head relative to the partitioning assembly. In that manner the head can be moved into a compliant transducing relationship with the target disk.

While the device in the incorporated reference produces excellent transducing results over the inner tracks of each disk, the outer tracks produce less satisfactory results due to variations in the air gap between head and disk occurring as the disk rotates. This is caused by vibrations induced into the head as a result of the waviness or wobbling of the flexible disk as it is rotated on the spindle. This waviness is accentuated in amplitude on tracks near the outer periphery of the disks and since there if increased relative speed between the head and the outer tracks as compared to the inner tracks, these two factors combine to cause the head to bounce or vibrate when it is positioned on the outer tracks. The frequency of vibration differs from track to track and from disk to disk making mechanical damping of the vibrations difficult to achieve.

Thus it is the general object of this invention to provide suspension means for the transducing head in a flexible disk recording device whereby the transducing head is properly tensioned in compliant recording relation to the flexible disk surface and is allowed to follow the waviness of the rotating disk without itself going into oscillation.

SUMMARY OF THE INVENTION

This invention provides an air damped suspension means to support the transducing head on a flexible disk recording device. In a preferred embodiment, the head is mounted on a movable housing that fits closely over a chamber which is machined into one surface of a rigid arm. The housing is held in juxtaposition to the arm by a tensioned hinge means. An inlet to supply a gaseous fluid such as air under pressure to the chamber is provided to pressurize the chamber forcing the housing away from the rigid arm. In that manner the head is moved axially into proper compliant transducing relationship with the disk surface and vibratory movements of the head brought about by the influence of waviness in the rotating disk are damped by virtue of the resistance of the chamber to any change in its volume.

An important feature of the invention is the maintenance of a substantially constant resistance to the flow of gaseous fluid out of the chamber regardless of the amount by which the housing is moved away from the rigid arm within a transducing working range of axial head movement. By maintaining constant escape flow resistance, the pressure in the chamber is maintained constant resulting in a constant mating force of head to disk. This feature is achieved in the preferred embodiment by providing surfaces on the arm around which the fluid escapes from the chamber such that the length of the surfaces is small compared with the length of interfacing housing surfaces. In that manner, the resistance of the escape path over the interfacing surfaces is constant regardless of the position of the housing with respect to the arm.

DETAILED DESCRIPTION OF A PREFERRED EMBODIMENT

Figure 1:
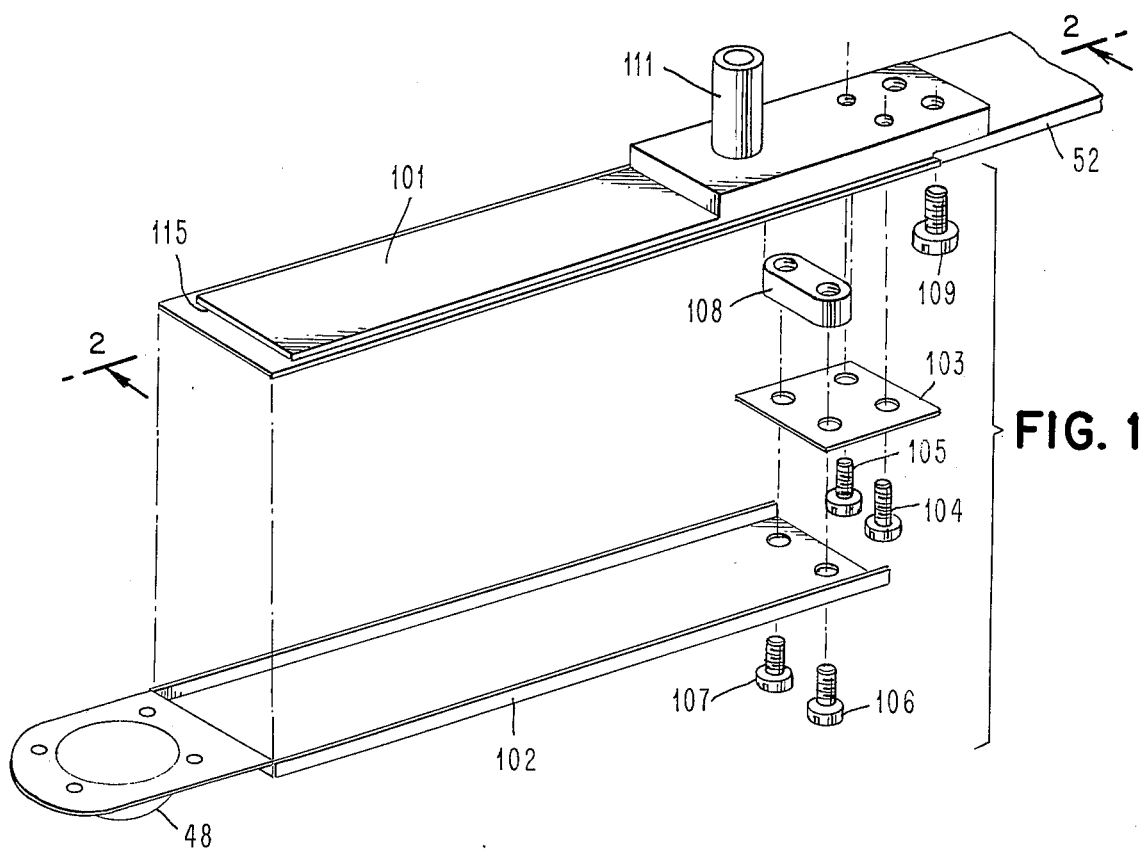
FIG. 1 is an exploded view of the head suspension assembly.

In FIG. 1 a rigid arm 101 and a movable housing 102 are shown in an exploded view with the connecting mechanisms employed to provide a pivoting connection of the movable housing to the rigid arm. The connecting mechanisms include a spring steel hinge means 103 solidly connected to the rigid arm 101 by connecting screws 104 and 105. A solid connection is also made between the hinge 103 and the movable housing 102 by connecting screws 106 and 107 fastening into nut 108. A transducing head 48 is mounted at a free end of the movable housing 102. The entire assembly is connected through fasteners 109 to a carriage 52 corresponding to carriage 52 in the aforenamed patent application incorporated by reference.

Figure 2:
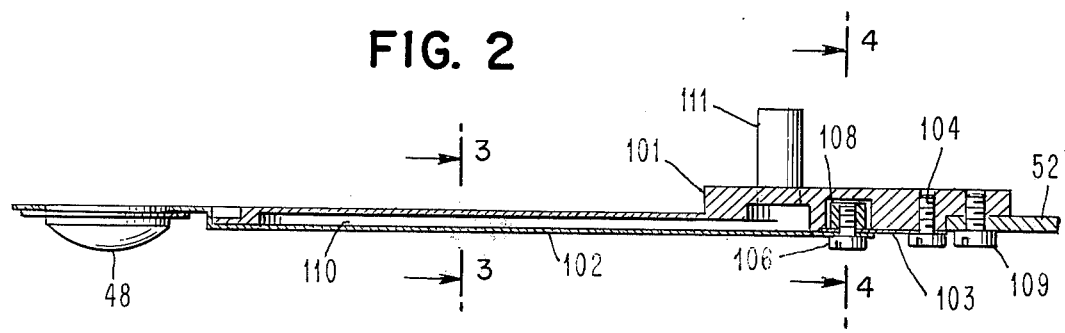
FIG. 2 is a cross section of the assembled head suspension mechanism taken along line 2—2 in FIG. 1.

FIG. 2 shows the rigid arm and the movable housing in assembled relationship along a cross section 2—2 taken in FIG. 1. The arm and the housing are shown in a closed position where the biassing force exerted by hinge 103 dominates the movement of the housing.

FIG. 2 clearly shows the chamber 110 which is machined into the undersurface of the generally rectangularly shaped bar comprising the rigid arm 101. Air or other gaseous fluid is fed under pressure to the chamber 110 from the inlet port 111. As pressure is built up in the chamber 110, forces are exerted to overcome the biassing force of the hinge means 103 in order to separate the movable housing 102 from the rigid arm 101 causing the housing to pivot around the hinge means 103 thus expanding the size of the chamber 110 and moving the transducing head 48 which is mounted at a free end of the movable housing.

Figure 3:
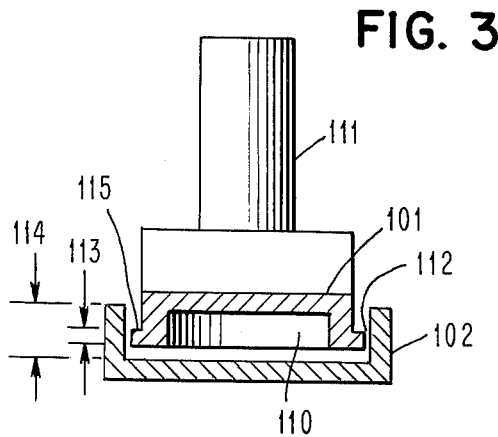
FIG. 3 is a cross section of the assembly taken along line 3—3 in FIG. 2 showing the assembled relationship of the rigid arm and the movable housing enclosing the air chamber.

FIG. 3 shows a cross section of the assembled arm and housing taken along line 3—3 in FIG. 2. For clarity, the movable housing 102 is shown separated (by gaseous forces) from the rigid arm 101 in a manner such as would occur during a transducing operation. A path 112 of small clearance is provided between the inner surfaces of the flanges of the channel shaped housing 102 and the interfacing surface of the rigid arm 101. The clearance of path 112 may be, for example, 0.002 inch and provides a path through which the air or other gas can escape from chamber 110. Note that arm 101 is cut back at 115 such that a small surface of dimension 113 is provided for an interface with the flange of the channel shaped housing 102. This cut back in the rigid arm 101 can also be seen at 115 in FIG. 1. The dimension 114 is the length of the inner surface of the flange of the channel shaped housing 102 and the difference in the length of the interfacing surfaces defining the escape path 112, that is, the difference between lengths 114 and 113 define the working range of movement for the head. If the head is moved out of this range, obviously the length of path 112 would change causing the resistance to the escape of gas from chamber 110 to change, resulting in unstable mating force conditions.

Figure 4:
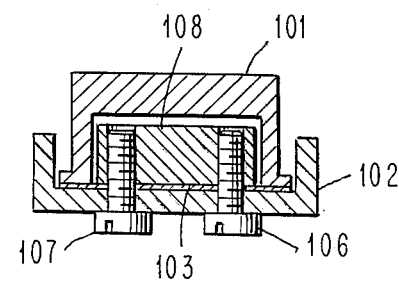
FIG. 4 is a cross section taken along line 4—4 in FIG. 2 showing the connecting means for clamping the tensioned hinge means to the movable housing.

FIG. 4 shows a cross section of the assembly taken along line 4—4 in FIG. 2. Here it is clearly shown that fasteners 106 and 107 together with nut 108 clamp the hinge means 103 and the movable housing 102 together solidly without also attaching to the rigid arm 101. Thus a pivoting of the movable housing is brought about by the hinge means 103 since the hinge means is solidly attached to the arm 101 as shown by fastener 104 in FIG. 2.

During operation of the flexible disk recording device the entire head suspension assembly with the transducing head 48 is inserted into the flexible disk pack at a desired location. The transducing head 48 is positioned near the desired track by suitable mechanisms such as are disclosed in the referenced patent applications. Next, air or other gaseous fluid is introduced through inlet port 111 to fill chamber 110 and move the transducing head 48 in an axial direction into transducing relationship with the selected track. If the desired transducing force is, for example, 20 grams, the head 48 will move toward the track and will continue to move until a counter-balancing force of 20 grams is exerted by the track on the transducing head 48. At that point axial movement of the head will cease and all axial forces on the head will be in balance. Because of the escape path at 112, a small amount of air or other gaseous fluid will continue to flow into chamber 110 through the inlet port 111 in order to balance the escape of the fluid through path 112 and in order to maintain force balance.

Because of the fact that the disks being used in this device are flexible, the surface of the target disk does not remain in a constant plane throughout the 360 degrees of disk rotation. As a result, the desired transducing force between disk surface and head tends to vary as the disk rotates. Suppose, for example, that the desired transducing force is 20 grams and the waviness factor reduces the counter-balancing force on the head to ten grams at a particular point during the rotation. This would tend to cause the head 48 to move in the axial direction, and it will so move. However, the rapidity of movement of the head will be damped by virtue of the chamber 110 and the resistance of that chamber to any changes in its volume. In the example, as transducing head 48 moves to follow the disk surface, chamber 110 would tend to increase in size. However, such an increase in size would tend to create a vacuum and, of course, 10 grams is insufficient force to accomplish that. Instead, this device acts to change the volume of the chamber until the forces are once again in balance by virtue of the fluid which enters through inlet 111 but escapes at a slower rate through escape path 112 until force balance of 20 grams is once again achieved.

Conversely, should the disk surface supply a force of thirty grams against the transducing head 48 at another point in the rotation, the result would be a tendency to compress the chamber 110 in size. In this instance fluid would be forced out through escape path 112 at an increased rate, however, the capacities of escape path 112 coupled with the continued supply of fluid through port 111 damps the rapidity of the change in the size of chamber 110. Thus the head is prevented from going into oscillation as a result of repeated increases and decreases in force on the head from the disk surface.

An important feature of the invention is the cut back shown in FIG. 3 at 115 which leaves only a relatively small surface of dimension 113 to interface with the surface of the flange on housing 102. The difference in the dimensions 114 and 113 produce a working range of axial movement in which the head can be moved without destroying the length of the escape path 112 through which the fluid escapes from chamber 110. By preserving a constant resistance to the flow of fluid out of chamber 110 regardless of the position of the transducing head within that working range of axial head movement, the positioning force of, for example, twenty grams is constant regardless of the position of the head.

Various alternative constructions to the preferred embodiment described above are feasible. For example, the chamber need not be open to the environment through a path 112. If seals were provided to close path 112, and if the seals were frictionless or nearly so, the device would work as well as the preferred embodiment. An orifice in the input line 111 would be necessary to damp the rate of expansion or contraction of the chamber. Another alternative would be an expansible balloon type chamber cemented on one side to the rigid arm and on the other side to the housing. An orifice in the input line would again be necessary. Further variations are possible such as different connecting means between the housing and the arm.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a flexible disk magnetic recording device wherein a stack of flexible disks are mounted for rotation on a spindle, said device including means for placing a transducing head into proper compliant transducing relationship with any selected track on any selected disk surface, an improved head suspension assembly for use with a source of gas under elevated pressure relative to the external environment of said assembly, including:

damping means for preventing oscillation of the transducing head over all frequencies of oscillation induced in said head from following variations in the plane of disk rotation, wherein said damping means includes a gaseous filled chamber means receiving gas under elevated pressure from said source, and an escape path means connected to said chamber means for providing a constant gas flow resistance to the escape of gas from said chamber means over a transducing working range of axial head movement to provide for a substantially constant mating force between head and disk surface throughout said working range, whereby the axial movements of said head in following variations in the plane of disk rotation are damped in a manner not dependent upon the amplitude or frequency of said variations.

2. The head suspension assembly of claim 1 wherein said damping means comprises a rigid arm a movable housing means, said chamber located between said arm and said housing means said transducing head mounted for movement with said housing means connecting means holding said arm, chamber and housing in assembly biassing means to exert a biassing force to hold said housing in a chamber depressing position, and a port means connecting said source of gaseous pressure to said chamber means through which gas under fluid under pressure is fed to fill said chamber whereby a force is developed overcoming said biassing force in order to axially move said head into transducing relationship with said selected track.

3. The head suspension assembly of claim 1 wherein said damping means comprises a rigid arm, said chamber located in said arm open to the environment at one side when not in assembly, a movable housing means to enclose said chamber in assembly, said housing means having a pivoting end and a free end when in assembly, said transducing head mounted at said free end of said housing means, hinge means connected to said housing means at said pivoting end, said hinge means also attached to said rigid arm, said hinge means providing a biassing force to hold said housing means in chamber enclosing assembled relationship with said arm, a port means in said arm connecting said source of gas under pressure to said chamber means through which gaseous fluid under pressure is fed to fill said chamber whereby a force is developed overcoming said biassing force in order to axially move said head into transducing relationship with said selected track, escape means providing a path to allow said gaseous fluid to escape from said chamber means whereby, when all axial forces are in balance on said movable housing, said gaseous fluid escapes from said chamber at a rate equal to the rate at which said gaseous fluid enters said chamber means through said port means, and whereby the volume of said chamber means is resistive to change resulting in a damping of axial head movement.

4. The assembly of claim 3 wherein said rigid arm is comprised of a rectangularly shaped bar and said chamber is located in one surface of said bar.

5. The assembly of claim 4 wherein said housing means is comprised of a channel shaped member.

6. The assembly of claim 5 wherein said escape means comprises the surfaces of said arm and the surfaces of the flanges of said channel-shaped housing means, said surfaces interfacing one another in close non-contacting juxtaposition, the length of said surfaces on said arm smaller than the length of said surfaces of the flanges, the difference in said lengths defining the transducing working range of axial head movement.

7. The assembly of claim 6 wherein said hinge means comprises a spring member.

* * * * *